S. MALONE.
Hand Seeder.
No. 315.
Reissued July 10, 1855.
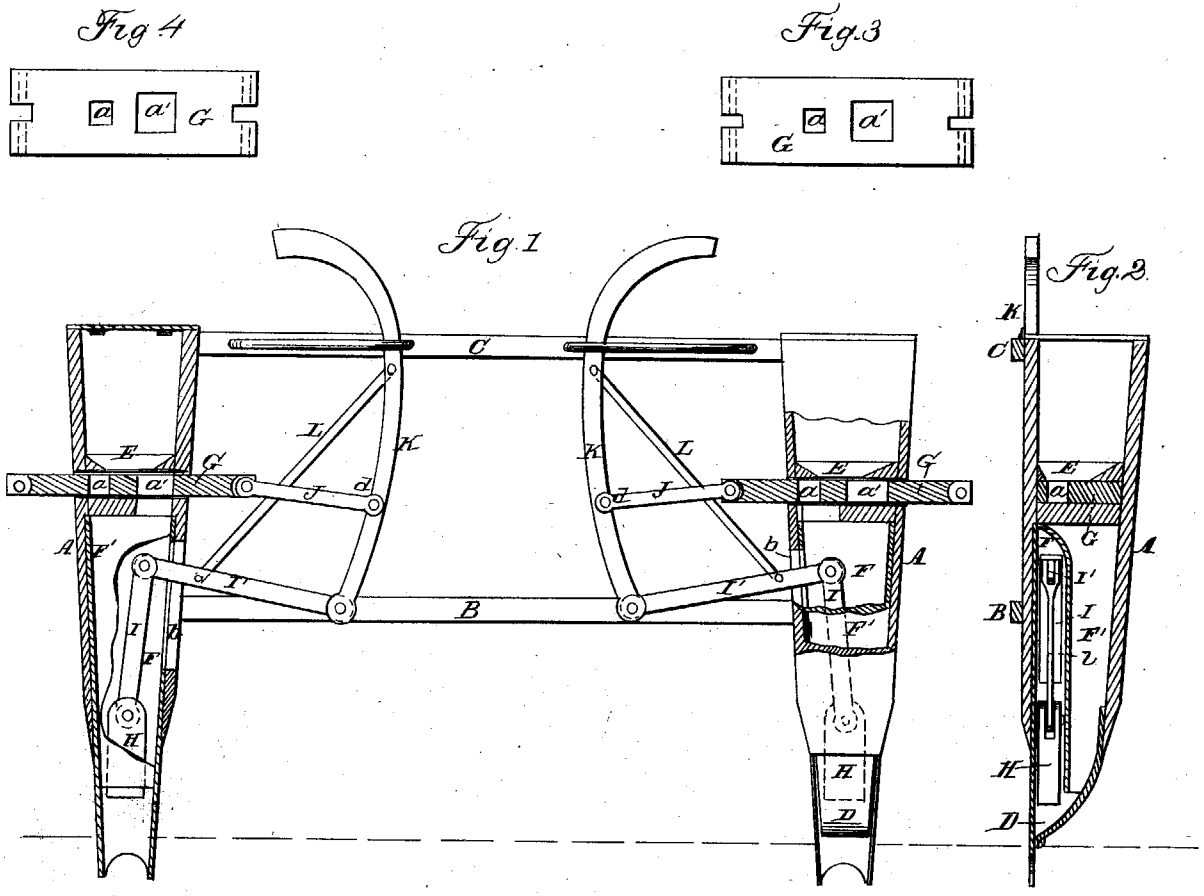
N. PETERS, PHOTO-LITHOGRAPHER, WASHINGTON, D. C.

UNITED STATES PATENT OFFICE.

SAMUEL MALONE, OF TREMONT, ILLINOIS.

IMPROVEMENT IN CORN-PLANTERS.

Specification forming part of Letters Patent No. 10,393, dated January 3, 1854; Reissue No. 315, dated July 10, 1855.

*To all whom it may concern:*

Be it known that I, SAMUEL MALONE, of Tremont, in the county of Tazewell and State of Illinois, have invented a new and useful Improvement in Hand Seed-Planters; and I do hereby declare that the following is a full, clear, and exact description of the same, reference being had to the accompanying drawings, forming part of this specification, in which—

Figure 1 is a view looking from the rear of a hand corn-planter constructed after my invention. In this view one of the tubes which hold and at the proper time conduct the corn into the ground is shown in section, and a portion of the middle partition broken away, so as to make the arrangement of the mechanism more evident, while the other tube is shown partly in section and partly in elevation. Fig. 2 is a vertical central section of one of the tubes. Figs. 3 and 4 are top views of the horizontal seed-slide.

Similar letters of reference indicate corresponding parts in each of the several figures.

The nature of my invention consists, first, in combining the horizontal feeding-slide with the vertical discharging-slide or plunger in the manner and by the means herein shown, so that they shall both be operated at the same time by one movement of the hand. By this combination, which I believe never was made prior to my invention, I am enabled to have a machine which will supply seed from the hopper into the conducting-tubes at every upward movement of the vertical slide and drop and discharge seed into the ground at every downward movement of the same, and thus save one-half the time and labor usually expended in planting a hill of corn with the hand-planters used prior to my invention.

It consists, second, in providing two tubes, two handles, and two sets of slides, and arranging and combining the whole in the manner hereinafter specified. By this arrangement and combination I am enabled to produce a double hand planting-machine, which is capable of planting two hills of corn at one operation, and which can be operated with the same, if not with greater, ease and convenience than the single hand-planters in use.

It consists, third, in providing the horizontal slide with two holes, one larger than the other, and making it capable of being reversed, so that the quantity of grain may be lessened or increased as desired.

To enable others skilled in the art to make and use my invention, I will proceed to describe its construction and operation.

A A represent the seed-tubes, connected together by cross-pieces B C. Each of these seed-tubes has a spring-discharge, D, at its lower end and a hopper or seed-chamber, E, near its upper end. An extension or metal point is also provided below the spring-discharge, so that the hole for the corn may be formed without having the spring-discharge enter the soil. This extension is made concave on its lower edge, as shown in the drawings, and by it all danger of the plunger, when the soil is damp, drawing the seed out of the ground is avoided. Each of the tubes has two chambers or passages, F F′, which terminate in one at the spring-discharge, as shown. The passage F′ communicates with the discharge-passage in the bottom of the hopper, and serves as a seed-passage to the spring-discharge.

G is the horizontal slide, and H the vertical plunger or slide. G slides over the bottom of the hopper, being inserted from the outside. H plays up and down in the chamber or passage E. Both ends of the horizontal slide are made alike, so that it may be conveniently attached whenever reversed. It is provided with two holes, *a a′*, which are of different sizes, so that by simply reversing the slide the quantity of grain planted in a hill may be varied. These holes are so situated that both shall not operate at the same time, and that in case the large hole is in operative position, as in Fig. 4, and it is desired to have the small hole occupy its place, as in Fig. 3, by simply reversing the slide and attaching its opposite end to the operative mechanism it shall be made to take the place of the same, and vice versa in case the small hole is in operation and it is desired to have the large one take its place.

I I I′ I′ represent knee-levers for operating the plungers or vertical slides. The parts I′ I′ of these levers play in slots *b b*, cut through the inner sides of the tubes.

J J are links for operating the horizontal slides.

K K are swinging handles, by which the machine is transported and operated. The levers I I′ are jointed to these handles at *c c* and the links at *d d*, as shown.

L L are diagonal braces secured in the upper parts of the handles and in the outer ends of the parts I′ I′ of the knee-levers. These braces cause the plungers to descend when the handles are swung from the center of the machine and cause them to rise when they are swung toward the center of the same.

This machine is made light enough to be carried from hill to hill by a man. The farmer stands behind and in the center of the machine, and lays hold of the handles and presses downward upon them, so as to form the holes in the soil for the corn, then moves them laterally from his sides, and thereby operates both sets of slides at the same time, the horizontal slides taking positions for receiving fresh supplies to deposit into the spring-discharges and the vertical plungers descending and forcing open the spring-discharges and letting out whatever may have been confined in the same. The handles are now drawn toward the sides of the farmer, and the holes of the horizontal slides thereby caused to come in line with the holes in the hoppers and drop the grain which they receive from the hoppers into the seed-chambers F′ F′, which conduct it into the spring-discharges, ready to be let out when the plungers are again caused to descend, which takes place after the machine has been moved in line with the next unplanted furrow or row of hills, and the holes to receive the corn are made in the soil.

What I claim as my invention, and desire to secure by Letters Patent, is—

The peculiar construction of the horizontal slide G, made reversible from end to end for the purpose of varying the quantity of seed planted, in the manner set forth and specified.

SAMUEL MALONE.

Witnesses:
LESTER PATEE,
RIENZI ROBERTZ.